United States Patent
Grossman (10) Patent No.: US 11,172,664 B1
(45) Date of Patent: Nov. 16, 2021

(54) FISHING LURE LAUNCHING DEVICE

(71) Applicant: Charles Grossman, Cincinnati, OH (US)

(72) Inventor: Charles Grossman, Cincinnati, OH (US)

( * ) Notice: Subject to any disclaimer, the term of this patent is extended or adjusted under 35 U.S.C. 154(b) by 392 days.

(21) Appl. No.: 16/372,591

(22) Filed: Apr. 2, 2019

(51) Int. Cl.
  *A01K 91/02* (2006.01)
  *F41B 11/682* (2013.01)
  *F41B 11/80* (2013.01)

(52) U.S. Cl.
  CPC ............ *A01K 91/02* (2013.01); *F41B 11/682* (2013.01); *F41B 11/80* (2013.01)

(58) Field of Classification Search
  CPC ..................................................... A01K 91/02
  USPC ............................................................. 43/19
  See application file for complete search history.

(56) References Cited

U.S. PATENT DOCUMENTS

| | | | | |
|---|---|---|---|---|
| 764,853 A * | 7/1904 | Kimberlin | ............... | A01K 91/02 43/19 |
| 1,473,507 A * | 11/1923 | Obermaier | ............. | A01K 91/02 43/19 |
| 2,217,820 A * | 10/1940 | Rowe | ..................... | A01K 91/02 43/19 |
| 2,548,102 A * | 4/1951 | Elliott | ..................... | A01K 91/02 43/19 |
| 2,584,678 A * | 2/1952 | Dewey | ................... | A01K 91/02 43/19 |
| 2,605,569 A * | 8/1952 | Kronhaus | ............... | A01K 91/02 43/19 |
| 2,671,289 A * | 3/1954 | McCullough | .......... | A01K 91/02 43/19 |
| 2,856,911 A * | 10/1958 | Maxwell | ................ | A01K 91/02 124/71 |
| 2,864,197 A * | 12/1958 | Johnson | .................. | A01K 91/02 43/19 |
| 2,924,211 A * | 2/1960 | McSwain | ................ | F41B 11/83 124/61 |
| 2,958,975 A * | 11/1960 | Neff | ....................... | A01K 87/00 43/19 |

(Continued)

FOREIGN PATENT DOCUMENTS

| | | | | |
|---|---|---|---|---|
| EP | 0317317 | | 5/1989 | |
| GB | 1206447 A | * | 9/1970 | ............. A01K 91/02 |

(Continued)

*Primary Examiner* — Darren W Ark
(74) *Attorney, Agent, or Firm* — Kyle A. Fletcher, Esq.

(57) ABSTRACT

The fishing lure launching device is a mechanical device. The fishing lure launching device launches a payload. In the first potential embodiment of the disclosure, the payload comprises one or more elements selected from the group consisting of a fishing line, a fishing lure, a leader and a swivel. An example of a fishing lure is a spinnerbait lure. The fishing lure launching device launches the payload on a controlled trajectory. The fishing lure launching device is a pneumatically operated device. The fishing lure launching device comprises a bucket, a transfer shaft, a thrust structure, a trigger valve, an adjustable pressure regulator, and a gas source. The payload is contained in the bucket. The transfer shaft attaches the bucket to the thrust structure. The thrust structure generates the forces necessary to launch the payload out of the bucket. The trigger valve initiates the operation of the thrust structure.

15 Claims, 5 Drawing Sheets

(56) References Cited

U.S. PATENT DOCUMENTS

| | | | | |
|---|---|---|---|---|
| 2,977,706 | A * | 4/1961 | Merz | A01K 91/02 43/19 |
| 3,392,473 | A * | 7/1968 | Dietsch | A01K 91/02 43/19 |
| 3,416,256 | A * | 12/1968 | Blocker | A01K 91/02 43/19 |
| 3,419,991 | A * | 1/1969 | Mitchell | A01K 91/02 43/19 |
| 3,579,896 | A * | 5/1971 | Flottorp | A01K 91/02 43/19 |
| 3,656,252 | A * | 4/1972 | Sherman | A01K 91/02 43/19 |
| 3,717,947 | A * | 2/1973 | Nomura | A01K 91/02 43/19 |
| 3,828,459 | A * | 8/1974 | Easom | A01K 91/02 43/19 |
| 3,834,056 | A * | 9/1974 | Filippi | A01K 91/02 43/19 |
| 4,110,929 | A | 9/1978 | Weigand | |
| 4,501,085 | A * | 2/1985 | Barnes | A01K 91/02 124/74 |
| 4,631,852 | A | 12/1986 | Whritenour | |
| 4,682,437 | A * | 7/1987 | Akerberg | A01K 91/02 43/19 |
| 4,845,879 | A * | 7/1989 | Urso | A01K 87/00 43/18.1 R |
| 5,060,413 | A * | 10/1991 | Garcia | A01K 91/02 43/19 |
| 5,193,298 | A * | 3/1993 | O'Neill | A01K 91/02 43/19 |
| 5,224,701 | A * | 7/1993 | Sciarrillo | A63B 69/409 124/56 |
| 5,421,116 | A * | 6/1995 | Moon | A01K 91/02 43/19 |
| D377,204 | S * | 1/1997 | Athanasiadis | D22/134 |
| 6,497,066 | B1 * | 12/2002 | Harrison | A01K 91/02 124/76 |
| 7,409,794 | B2 * | 8/2008 | Triano | A01K 91/02 124/73 |
| 7,694,452 | B2 * | 4/2010 | Croisetiere | A01K 91/02 43/19 |
| 7,712,244 | B2 * | 5/2010 | Mamae | A01K 97/02 43/19 |
| 9,546,855 | B2 * | 1/2017 | Higham | F42B 12/68 |
| 10,034,466 | B2 * | 7/2018 | Essafi | A01K 87/007 |
| 2004/0139647 | A1 * | 7/2004 | Esberger | A01K 91/02 43/19 |
| 2005/0108919 | A1 * | 5/2005 | Staelens | A01K 91/02 43/19 |
| 2007/0214705 | A1 * | 9/2007 | Osenbauch | A01K 91/02 43/19 |
| 2009/0178328 | A1 * | 7/2009 | Jelnicki, Jr. | F41B 11/62 43/19 |
| 2009/0178329 | A1 * | 7/2009 | Jelnicki, Jr. | A01K 91/02 43/19 |
| 2015/0230445 | A1 * | 8/2015 | Fotland | A01K 91/02 124/60 |

FOREIGN PATENT DOCUMENTS

| | | | | |
|---|---|---|---|---|
| GB | 2397208 A | * | 7/2004 | ............ A01K 91/02 |
| JP | 50004589 B | * | 2/1975 | |
| JP | S504589 B1 | * | 2/1975 | |
| JP | 09028258 A | * | 2/1997 | |
| WO | WO-2005107449 A1 | * | 11/2005 | ........... A01K 87/007 |
| WO | WO-2007109151 A2 | * | 9/2007 | ............. A01K 91/02 |
| WO | WO-2018151502 A1 | * | 8/2018 | ............. A01K 95/00 |

* cited by examiner

FISHING LURE LAUNCHING DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of fishing including catching fish, more specifically, a device for casting a fishing line. (A01K91/02)

SUMMARY OF INVENTION

The fishing lure launching device is a mechanical device. The fishing lure launching device launches a payload. In the first potential embodiment of the disclosure, the payload comprises one or more elements selected from the group consisting of a fishing line, a fishing lure, a leader and a swivel. An example of a fishing lure is a spinnerbait lure. The fishing lure launching device launches the payload on a controlled trajectory. The fishing lure launching device is a pneumatically operated device. The fishing lure launching device comprises a bucket, a transfer shaft, a thrust structure, a trigger valve, an adjustable pressure regulator, and a gas source. The payload is contained in the bucket. The transfer shaft attaches the bucket to the thrust structure. The thrust structure generates the forces necessary to launch the payload out of the bucket. The trigger valve initiates the operation of the thrust structure. The adjustable pressure regulator controls the gas pressure released into the thrust structure. The pressurized gas source is a high-pressure tank that contains the compressed gas necessary to operate the thrust structure.

These together with additional objects, features and advantages of the fishing lure launching device will be readily apparent to those of ordinary skill in the art upon reading the following detailed description of the presently preferred, but nonetheless illustrative, embodiments when taken in conjunction with the accompanying drawings.

In this respect, before explaining the current embodiments of the fishing lure launching device in detail, it is to be understood that the fishing lure launching device is not limited in its applications to the details of construction and arrangements of the components set forth in the following description or illustration. Those skilled in the art will appreciate that the concept of this disclosure may be readily and systems for carrying out the several purposes of the fishing lure launching device.

It is therefore important that the claims be regarded as including such equivalent construction insofar as they do not depart from the spirit and scope of the fishing lure launching device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
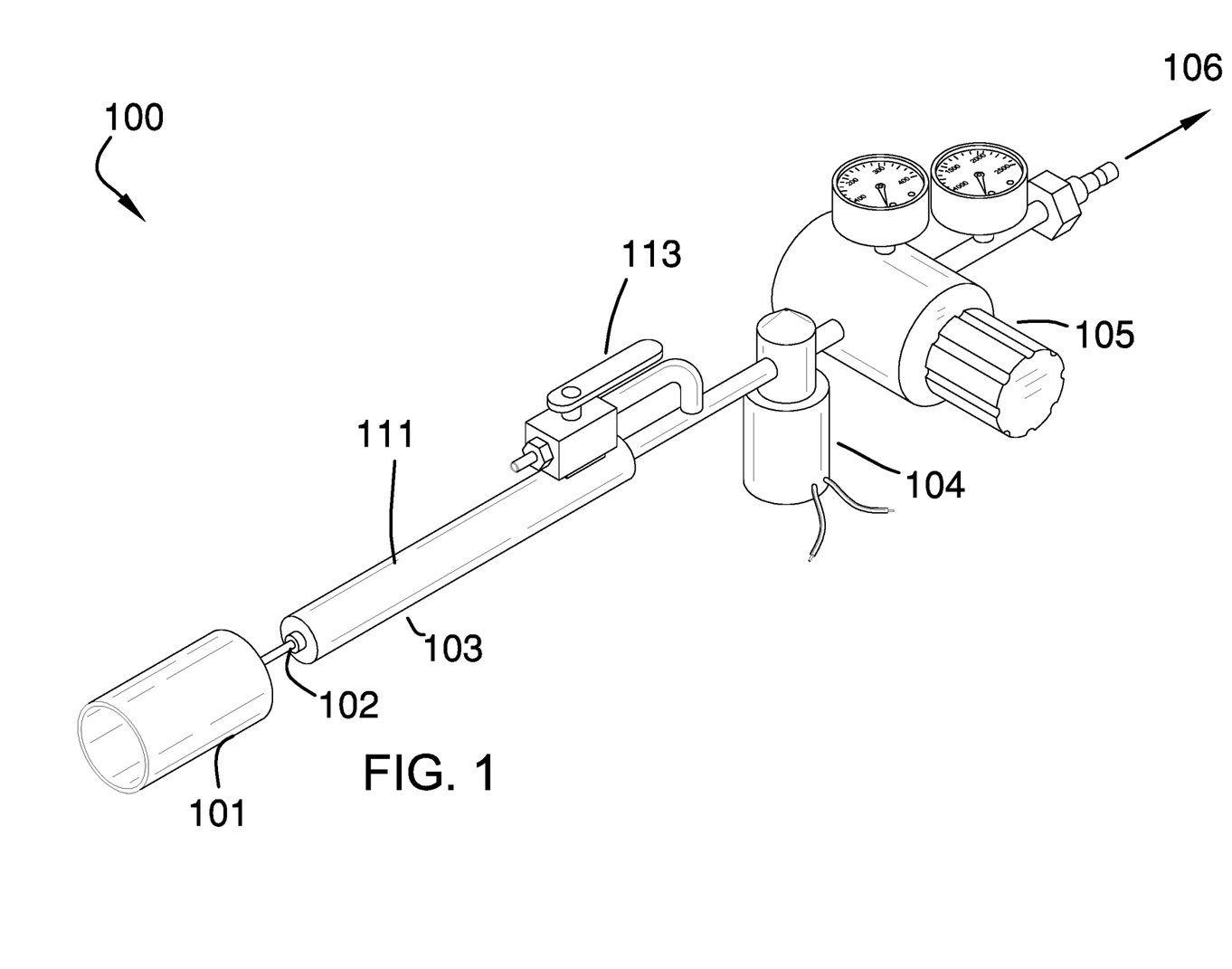
FIG. 1 is a perspective view of an embodiment of the disclosure.
Figure 2:
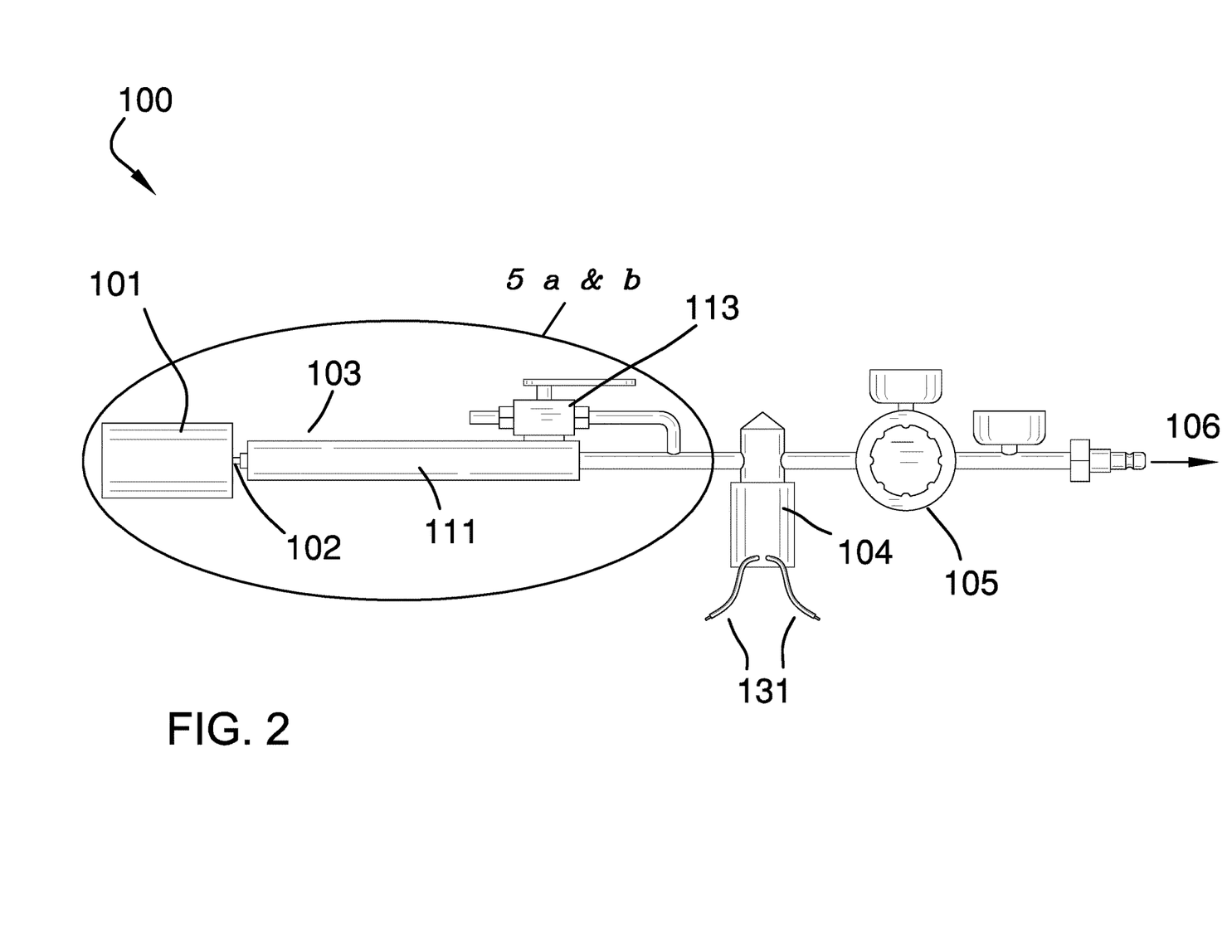
FIG. 2 is a side view of an embodiment of the disclosure.
Figure 3:
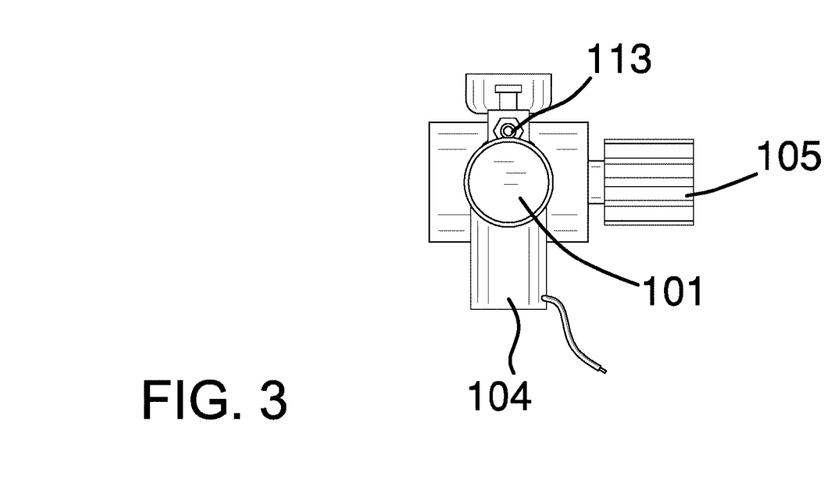
FIG. 3 is a front view of an embodiment of the disclosure.
Figure 4:
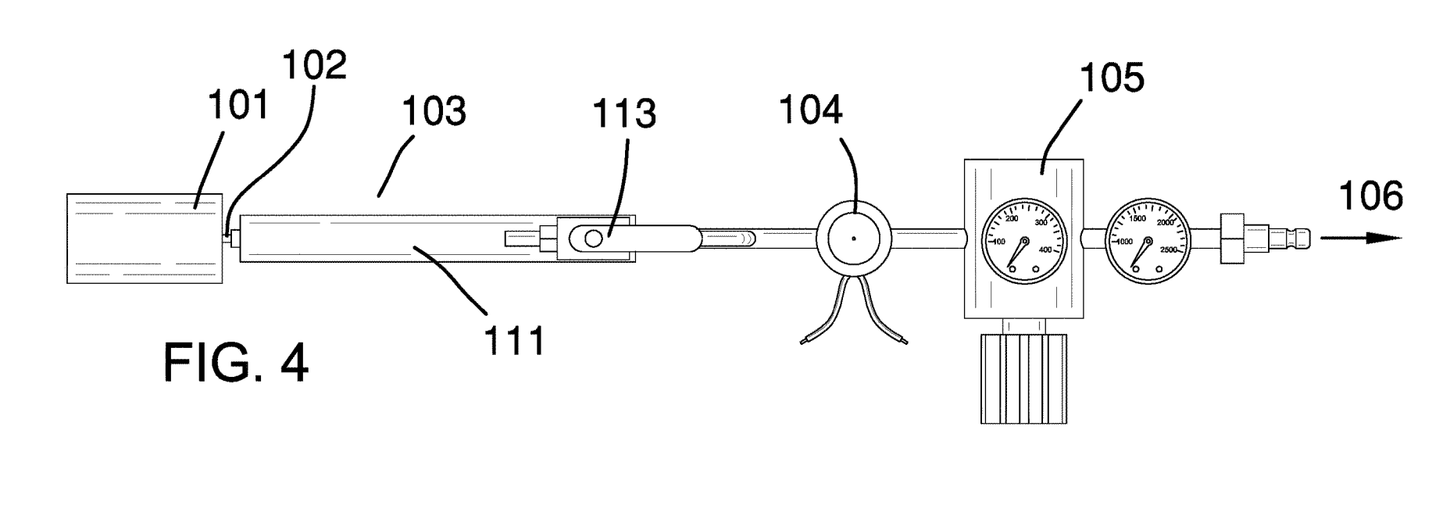
Figure 5A:
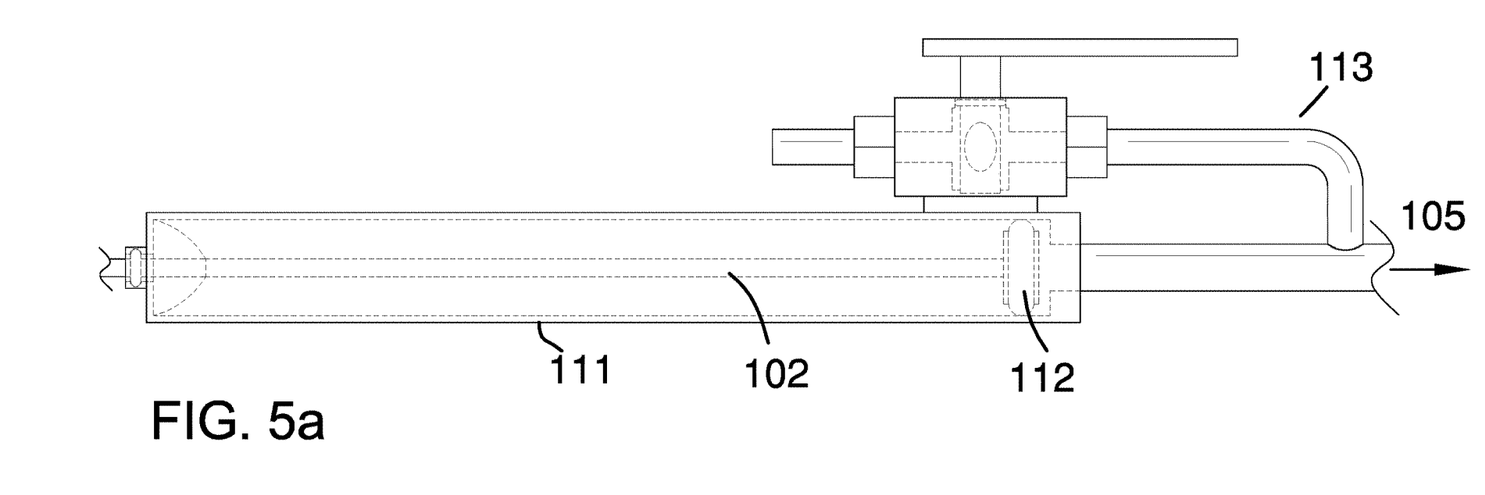
FIG. 5a is a detail view of an embodiment of the disclosure.
Figure 5B:
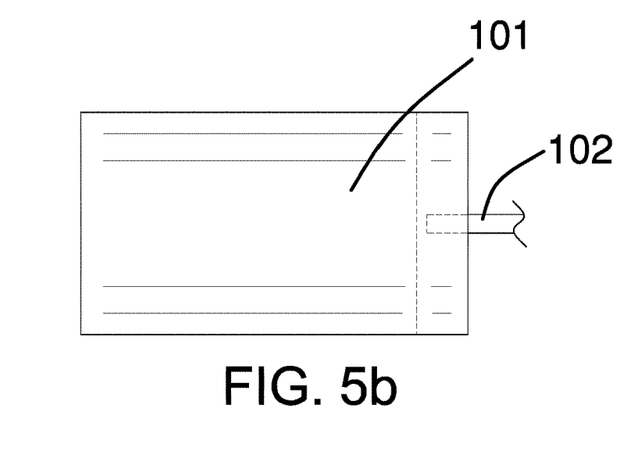
FIG. 5b is a detail view of an embodiment of the disclosure.
Figure 6:
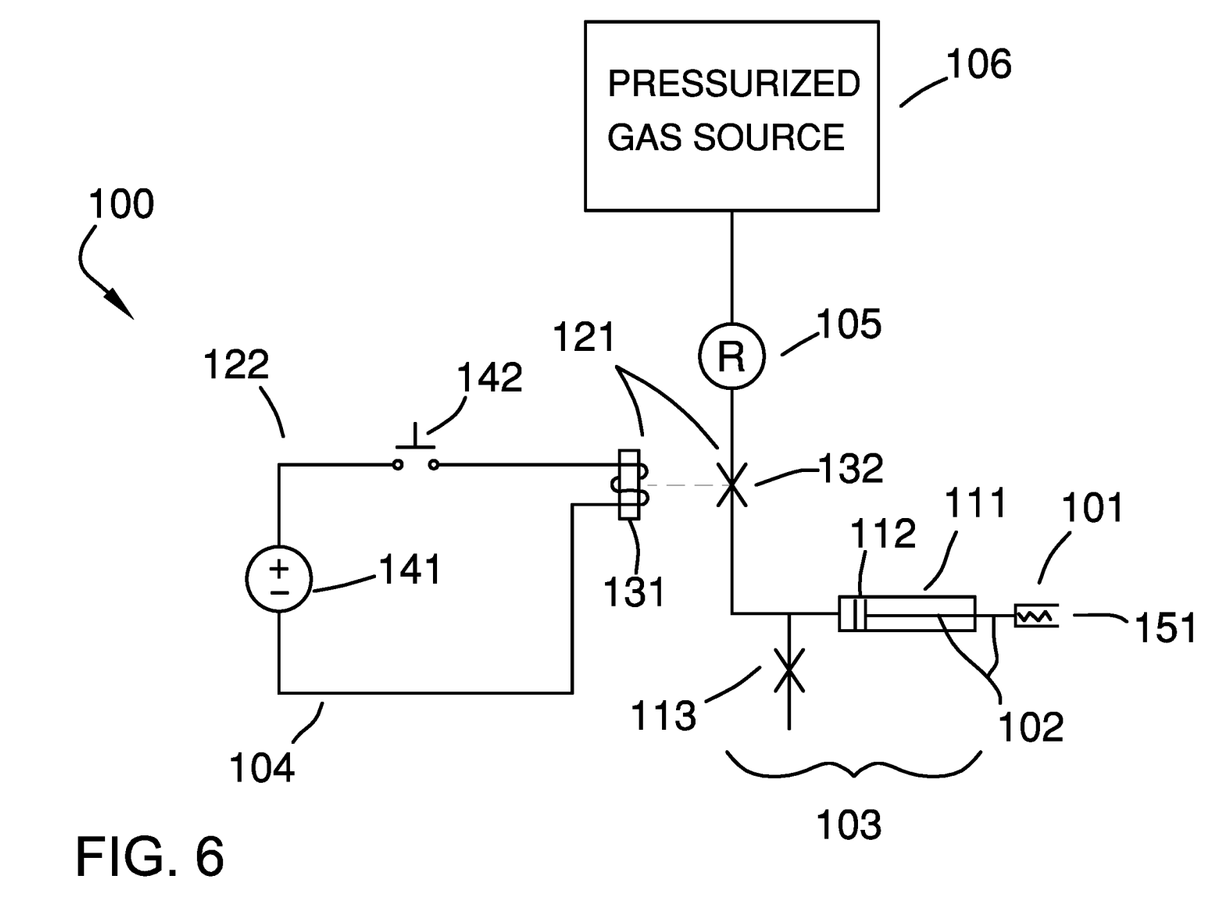
FIG. 6 is a schematic view of an embodiment of the disclosure.

Detailed reference will now be made to one or more potential embodiments of the disclosure, which are illustrated in FIGS. 1 through 6.

The fishing lure launching device 100 (hereinafter invention) is a mechanical device. The invention 100 launches a payload 151. In the first potential embodiment of the disclosure, the payload 151 comprises one or more elements selected from the group consisting of a fishing line, a fishing lure, a leader and a swivel. An example of a fishing lure is a spinnerbait lure. The invention 100 launches the payload 151 on a controlled trajectory. The invention 100 is a pneumatically operated device.

The invention 100 comprises a bucket 101, a transfer shaft 102, a thrust structure 103, a trigger valve 104, an adjustable pressure regulator 105, and a pressurized gas source 106. The payload 151 is contained in the bucket 101. The transfer shaft 102 attaches the bucket 101 to the thrust structure 103. The thrust structure 103 generates the forces necessary to launch the payload 151 out of the bucket 101. The trigger valve 104 initiates the operation of the thrust structure 103. The adjustable pressure regulator 105 controls the gas pressure released into the thrust structure 103. The pressurized gas source 106 is a high-pressure tank that contains the compressed gas necessary to operate the thrust structure 103.

The bucket 101 is a hollow prism-shaped structure. The payload 151 during the launch process. The payload 151 is launched from the bucket 101.

The transfer shaft 102 is a prism-shaped shaft structure. The transfer shaft 102 attaches to the closed face of the pan structure of the bucket 101. The closed face of the pan structure that forms the bucket 101 is that face that is distal from the open face of the pan structure that forms the bucket 101. The transfer shaft 102 attaches the bucket 101 to the thrust structure 103. The center axis of the transfer shaft 102 aligns with the center axis of the bucket 101.

The thrust structure 103 generates an impulse that pushes the transfer shaft 102 in a direction away from the thrust structure 103. The transfer shaft 102 transfers the impulse to the bucket 101 which transfers the impulse to the payload 151. The motion of the transfer shaft 102 and the bucket 101 abruptly terminate at the end of the impulse transfer resulting in the ejection of the payload 151 from the bucket 101 at the end of the launch process. The thrust structure 103 comprises a pneumatic cylinder 111, a piston 112, and a pressure relief valve 113.

The pneumatic cylinder 111 is a hollow prism-shaped structure. The pneumatic cylinder 111 forms a space into which the compressed gas admitted by the trigger valve 104 expands to generate the motive forces required to transfer an impulse to the transfer shaft 102 and the bucket 101. The use of a pneumatic cylinder 111 for the purposes described above is well-known and documented in the mechanical arts.

The piston 112 is a disk-shaped structure that installs in the pneumatic cylinder 111. The piston 112 installs in the pneumatic cylinder 111 such that the center axis of the piston 112 aligns with the center axis of the pneumatic cylinder 111. The piston 112 moves in the direction of the center axis of the pneumatic cylinder 111 as the compressed gas released by the trigger valve 104 expands within the pneumatic cylinder 111. The transfer shaft 102 attaches to the piston 112 such that the center axis of the transfer shaft 102 aligns with the center axis of the piston 112. The motion of the piston 112 within the pneumatic cylinder 111 transfers the expansion of the compressed gas into the impulse that ejects the payload 151 from the bucket 101 during the launch process.

The pressure relief valve 113 is a valve that forms a fluidic connection between the pneumatic cylinder 111 and the atmosphere. The pressure relief valve 113 opens to release the compressed gas from the pneumatic cylinder 111 after the launch process is completed. The pressure relief valve 113 is used to rest the invention 100 for subsequent payload 151 launches.

The trigger valve 104 is an electromechanical device that the adjustable pressure regulator 105. The trigger valve 104 controls the release of a gas under pressure from the adjustable pressure regulator 105 into the thrust structure 103. The release of the pressurized gas through the trigger valve 104 into the thrust structure 103 provides the impulse energy required to move the transfer shaft 102 away from the thrust structure 103. The trigger valve 104 comprises a solenoid valve 121 and a solenoid valve 121 trigger circuit 122.

The solenoid valve 121 is an electrically controlled valve that forms the fluidic connection between the adjustable pressure regulator 105 and the pneumatic cylinder 111 of the thrust structure 103. The solenoid valve 121 releases the compressed gas into the pneumatic cylinder 111 during the launch process. The solenoid valve 121 comprises a coil 131 and a pressure control valve 132.

The coil 131 is an electrically powered solenoid. The coil 131 is powered by the solenoid valve 121 trigger circuit 122. The coil 131 moves as it is energized and de-energized by the solenoid valve 121 trigger circuit 122. The movement of the coil 131 physically opens and closes the pressure control valve 132.

The pressure control valve 132 is the valve structure of the solenoid valve 121. The pressure control valve 132 forms regulator 105 and the pneumatic cylinder 111. The operation of the pressure control valve 132 is controlled by the solenoid valve 121 trigger circuit 122 through the coil 131.

The solenoid valve 121 trigger circuit 122 is an electrical circuit that controls the operation of the solenoid valve 121. The solenoid valve 121 trigger circuit 122 comprises an external power source 141 and a momentary switch 142.

The external power source 141 is an externally provided source of electrical energy. The external power source 141 provides the electrical energy required to operate the coil 131 of the solenoid valve 121. In the first potential embodiment of the disclosure, the external power source 141 is a battery. The battery is an electrochemical device. The battery converts chemical potential energy into the electrical energy used to power the coil 131.

The momentary switch 142 is a normally open switch. The momentary switch 142 is wired in series between the external power source 141 and the coil 131. The momentary switch 142 controls the flow of electricity through the coil 131 in order to open and close the pressure control valve 132.

The adjustable pressure regulator 105 is a mechanical device that forms a fluidic connection between the trigger valve 104 and the pressurized gas source 106. The adjustable pressure within the pressurized gas source 106. The adjustable pressure regulator 105 transports the compressed gas at the reduced pressure to the trigger valve 104. The pressure of compressed gas released from the adjustable pressure regulator 105 is adjustable. The adjustable pressure regulator 105 is defined elsewhere in this disclosure.

The ejection velocity of the payload 151 is adjusted by adjusting the pressure of the compressed gas that is released by the adjustable pressure regulator 105

The pressurized gas source 106 is a high-pressure tank that contains a gas at a pressure greater than normal temperature and pressure. The pressurized gas source 106 provides the power source that generates the impulse used to eject the payload 151 from the bucket 101. The use of compressed gas from a pressurized gas source 106 for this purpose is well-known and documented in the mechanical arts.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Atmosphere: As used in this disclosure, the atmosphere refers to a blanket of gases (primarily nitrogen and oxygen) that surround the earth. Typical atmospheric conditions are approximated and characterized as the normal temperature and pressure. Atmospheric gases are commonly called air.

Battery: As used in this disclosure, a battery is a chemical device consisting of one or more cells, in which chemical energy is converted into electricity and used as a source of power. Batteries are commonly defined with a positive terminal and a negative terminal.

Canister: As used in this disclosure, a canister is a containment vessel configured for use in storing a fluid under pressure.

Cargo: As used in this disclosure, cargo refers to one or more objects that are intended to be transported using a vehicle.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Compressed Gas: In this disclosure, compressed gas refers to a gas that has been compressed to a pressure greater than normal temperature and pressure.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Cord: As used in this disclosure, a cord is a long, thin, flexible, and prism-shaped string, line, rope, or wire. Cords are made from yarns, piles, or strands of material that are braided or twisted together or from a monofilament (such as fishing line). Cords have tensile strength but are too flexible to provide compressive strength and are not suitable for use in pushing objects. String, line, cable, and rope are synonyms for cord.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

External Power Source: As used in this disclosure, an external power source is a source of the energy that is externally provided to enable the operation of the present disclosure. Examples of external power sources include, but are not limited to, electrical power sources and compressed air sources.

Fishing Line: As used in this disclosure, a fishing line is a monofilament cord to which a hook is attached for the purpose of capturing a fish.

Fluid: As used in this disclosure, a fluid refers to a state of matter wherein the matter is capable of flow and takes the shape of a container it is placed within. The term fluid commonly refers to a liquid or a gas.

Fluidic Connection: As used in this disclosure, a fluidic connection refers to a tubular structure that transports a fluid from a first object to a second object. Methods to design and use a fluidic connections are well-known and documented in the mechanical, chemical, and plumbing arts.

Form Factor: As used in this disclosure, the term form factor refers to the size and shape of an object.

Gas: As used in this disclosure, a gas refers to a state (phase) of matter that is fluid and that fills the volume of the structure that contains it. Stated differently, the volume of a gas always equals the volume of its container.

Gauge: As used in this disclosure, a gauge is a measurement device that is configured to display the value that is being measured. Air pressure gauges and temperature gauges are well-known gauges.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

High-Pressure Air Tank: As used in this disclosure, a high-pressure air tank is a container that is used to store compressed gas.

Impulse: As used in this disclosure, an impulse refers to the application of a force over a period of time. The use of the term impulse often implies a relatively short period of time.

Launch: As used in this disclosure, to launch means to send a projectile into its trajectory.

Leader: As used in this disclosure, a leader is a length of cord that is a wire or monofilament cord to a fishing line to a lure or hook. The lure or hook is often connected to the leader with a swivel that prevents twisting of the fishing line or the leader from influencing the motion of the lure or hook while in the water.

Liquid: As used in this disclosure, a liquid refers to a state (phase) of matter that is fluid and that maintains, for a given pressure, a fixed volume that is independent of the volume of the container.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Lure: As used in this disclosure, a lure is an object used to attract an animal towards an object.

Momentary Switch: As used in this disclosure, a momentary switch is a biased switch in the sense that the momentary switch has a baseline position that only changes when the momentary switch is actuated (for example when a pushbutton switch is pushed or a relay coil is energized). The momentary switch then returns to the baseline position once the actuation is completed. This baseline position is called the "normal" position. For example, a "normally open" momentary switch interrupts (open) the electric circuit in the baseline position and completes (closes) the circuit when the momentary switch is activated. Similarly, a "normally closed" momentary switch will complete (close) an electric circuit in the baseline position and interrupt (open) the circuit when the momentary switch is activated.

Normal Temperature and Pressure: As used in this disclosure, normal temperature and pressure refers to gas storage conditions corresponding to 20 degrees C. at 100 kPa (approx. 1 atmosphere). Normal temperature and pressure is often abbreviated as NTP.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) an end of the prism structure that forms the pan; and, b) a lateral face of the prism structure that forms the pan.

Payload: As used in this disclosure, payload refers to: a) the cargo of a vehicle, especially an airborne vehicle; or, b) a projectile that is stored in and launched from a mechanical device.

Piston: As used in this disclosure, a piston is a disk that closely fits within a pipe or tube and that moves along the center axis of the pipe or tube. Depending on the context, a piston can also refer to the apparatus associated with the disk that allows the disk to move within the pipe or tube.

Pneumatic: As used in this disclosure, pneumatic refers to a device wherein the movement of the device is powered or controlled using a fluid under pressure.

Pressure: As used in this disclosure, pressure refers to a measure of force per unit area.

Pressure Regulator: As used in this disclosure, a pressure regulator refers to a mechanical device that takes receives a compressed gas and: a) reduces the pressure of the compressed gas to a constant pressure; and, b) maintains a flow of the compressed gas at the constant reduced pressure. An adjustable pressure regulator allows for the adjustment of the setting of the constant reduced pressure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Projectile: As used in this disclosure, a projectile refers to an object that is moving through the atmosphere.

Solenoid: As used in this disclosure, a solenoid is a cylindrical coil of electrical wire that generates a magnetic field that can be used to mechanically move a shaft made of a magnetic core.

Solenoid Valve: As used in this disclosure, a solenoid valve is an electromechanically controlled valve that is used to control fluid or gas flow. A two-port solenoid valve opens or closes to fluid flow through the valve portion of the solenoid valve. A three-port solenoid valve switched fluid or gas flow between a first port and a second port to either feed or be fed from a third port. A solenoid valve comprises a coil and a valve. The coil forms the solenoid that opens and closes the solenoid valve. The valve is the opens and closes to control the fluid flow.

Spinnerbait Lure: As used in this disclosure, a spinnerbait lure is a lure configured for use in catching fish. The spinnerbait lure comprises one or more components that emulate motions, vibrations, or reflections that commonly attract predator fish species.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Swivel: As used in this disclosure, a swivel is a device used in fishing to prevent a fishing line from twisting during use.

Trigger: As used in this disclosure, a trigger is a subcomponent of a mechanism that: a) is used to activate a mechanism; and, b) returns to its original position after the mechanism has been activated.

Valve: As used in this disclosure, a valve is a device that is used to control the flow of a fluid (gas or liquid) through a pipe, tube, or hose.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A fishing lure launching device comprising:
a bucket, a transfer shaft, a thrust structure, a trigger valve, an adjustable pressure regulator, and a pressurized gas source;
wherein the transfer shaft attaches the bucket to the thrust structure;
wherein the adjustable pressure regulator is a mechanical device that forms a fluidic connection between the trigger valve and the pressurized gas source;

wherein the trigger valve forms a fluidic connection between the thrust structure and the adjustable pressure regulator;

wherein the trigger valve initiates an operation of the thrust structure by controlling a release of a compressed gas from the adjustable pressure regulator into the thrust structure;

wherein the fishing lure launching device launches a payload;

wherein the payload comprises one or more elements selected from the group consisting of a fishing line, a fishing lure, a leader and a swivel;

wherein the fishing lure launching device launches the payload on a controlled trajectory;

wherein the payload is contained in the bucket;

wherein the thrust structure comprises a pneumatic cylinder, a piston, and a pressure relief valve;

wherein the piston installs in the pneumatic cylinder;

wherein the pressure relief valve forms a fluidic connection with the pneumatic cylinder and atmosphere;

wherein the pressure relief valve is located between the pneumatic cylinder and the trigger valve along the fluidic connection between the thrust structure and the adjustable pressure regulator;

wherein the trigger valve comprises a solenoid valve and a solenoid valve trigger circuit;

wherein the solenoid valve trigger circuit is an electrical circuit that controls an operation of the solenoid valve;

wherein the solenoid valve forms a fluidic connection between the adjustable pressure regulator and the pneumatic cylinder of the thrust structure; and wherein the pressure relief valve opens to release the compressed gas from the pneumatic cylinder to the atmosphere.

2. The fishing lure launching device according to claim 1 wherein the adjustable pressure regulator controls the compressed gas released into the thrust structure from the pressurized gas source.

3. The fishing lure launching device according to claim 2 wherein the thrust structure generates forces necessary to launch the payload out of the bucket.

4. The fishing lure launching device according to claim 3 wherein the bucket is a hollow prism-shaped structure; and wherein the bucket has the shape of a pan.

5. The fishing lure launching device according to claim 4 wherein the transfer shaft is a prism-shaped shaft structure;

wherein the transfer shaft attaches to a closed face of the bucket having the shape of a pan;

wherein a center axis of the transfer shaft aligns with a center axis of the bucket.

6. The fishing lure launching device according to claim 5 wherein the thrust structure generates an impulse that pushes the transfer shaft in a direction away from the thrust structure;

wherein the transfer shaft transfers the impulse to the bucket which transfers an impulse to the payload to launch the payload from the bucket.

7. The fishing lure launching device according to claim 6 wherein the adjustable pressure regulator reduces a pressure of the compressed gas contained within the pressurized gas source;

wherein the adjustable pressure regulator transports the compressed gas at the reduced pressure to the trigger valve;

wherein the pressure of the compressed gas from the adjustable pressure regulator is adjustable;

wherein an ejection velocity of the payload when the payload is launched from the bucket is adjusted by adjusting the pressure of the compressed gas that is released by the adjustable pressure regulator.

8. The fishing lure launching device according to claim 7 wherein the pressurized gas source contains the compressed gas which is at a pressure greater than normal temperature and pressure;

wherein the pressurized gas source provides a power source that generates the impulse used to launch the payload from the bucket.

9. The fishing lure launching device according to claim 8 wherein the pneumatic cylinder is a hollow prism-shaped structure;

wherein the pneumatic cylinder defines a space into which the compressed gas admitted by the trigger valve expands to generate motive forces required to transfer the impulse to the transfer shaft and the bucket.

10. The fishing lure launching device according to claim 9 wherein the piston is a disk-shaped structure that installs in the pneumatic cylinder;

wherein the piston installs in the pneumatic cylinder such that a center axis of the piston aligns with a center axis of the pneumatic cylinder;

wherein the piston moves in a direction of the center axis of the pneumatic cylinder as the compressed gas released by the trigger valve expands within the pneumatic cylinder.

11. The fishing lure launching device according to claim 10 wherein the transfer shaft attaches to the piston such that the center axis of the transfer shaft aligns with the center axis of the piston;

wherein the motion of the piston within the pneumatic cylinder transfers the expansion of the compressed gas into the impulse that launches the payload from the bucket.

12. The fishing lure launching device according to claim 11 wherein the pressure relief valve opens to release the compressed gas from the pneumatic cylinder.

13. The fishing lure launching device according to claim 12 wherein the solenoid valve comprises a coil and a pressure control valve;

wherein an operation of the pressure control valve is controlled by the solenoid valve trigger circuit through the coil.

14. The fishing lure launching device according to claim 13 wherein the coil is powered by the solenoid valve trigger circuit;

wherein the coil moves as it is energized and de-energized by the solenoid valve trigger circuit;

wherein a movement of the coil physically opens and closes the pressure control valve;

wherein the pressure control valve forms the physical fluidic connection between the adjustable pressure regulator and the pneumatic cylinder.

15. The fishing lure launching device according to claim 14 wherein the solenoid valve trigger circuit comprises an external power source and a momentary switch;

wherein the external power source provides electrical energy required to operate the coil of the solenoid valve;

wherein the momentary switch is a normally open switch;

wherein the momentary switch is wired in series between the external power source and the coil.

* * * * *